United States Patent [19]
Dimmick

[11] Patent Number: 5,841,536
[45] Date of Patent: Nov. 24, 1998

[54] POLARIZATION INTERFEROMETER APPARATUS USING THE POLARIZATION DEPENDENT PHASE LAG IN A BIREFRINGENT RETARDER

[75] Inventor: Timothy E. Dimmick, Glenville, Pa.

[73] Assignee: The United States of America as represented by the Director of the National Security Agency, Washington, D.C.

[21] Appl. No.: 904,535

[22] Filed: Aug. 1, 1997

[51] Int. Cl.$^6$ ....................................................... G01B 9/02
[52] U.S. Cl. ............................................ 356/346; 356/351
[58] Field of Search ..................................... 356/346, 351

[56] References Cited

U.S. PATENT DOCUMENTS

| | | | |
|---|---|---|---|
| 3,849,001 | 11/1974 | Inoue et al. | 356/346 |
| 3,927,945 | 12/1975 | Bates . | |
| 4,905,169 | 2/1990 | Buican et al. . | |
| 5,040,896 | 8/1991 | Moslehi | 356/351 |
| 5,245,408 | 9/1993 | Cohen . | |

FOREIGN PATENT DOCUMENTS

| | | | |
|---|---|---|---|
| 61-0132829 | 6/1986 | Japan | 356/346 |
| 0006431 | 1/1991 | Japan | 356/351 |

OTHER PUBLICATIONS

"Infrared Spectroscopy with an Interferometer", Boyce et al, Sky and Telescope, Feb. 1965, pp.78–80.

T. Woschnik, and W. Behmenburg, "Wavemeter for Controlled Funing of Near I.R. Diode LAsers," *Spectrochimica Acta.*, vol. 44B, pp. 949–955, 1989.

J.C. Braasch, W. Holzapfel, and S. Holzapfel, and S. Neuschaefer–Rube, "Wavelength Determination of Semiconductor Lasers: Precise but Inexpensive," *Optical Engineering*, vol. 34, pp. 1417–1420, 1995.

*Primary Examiner*—Samuel A. Turner
*Attorney, Agent, or Firm*—Stephen M. Bloor

[57] ABSTRACT

An inexpensive and accurate wavemeter for measuring the wavelength of monochromatic light is described. The device uses the wavelength dependent phase lag between principal polarization states of a length of birefringent material (retarder) as the basis for measuring the optical wavelength. The retarder is sandwiched between a polarizer and a polarizing beamsplitter and is oriented such that its principal axes are non-orthogonal to the axis of the polarizer and the principal axes of the beamsplitter. As a result of the disparity in propagation velocities between the principal polarization states of the retarder, the ratio of the optical power exiting the two ports of the polarizing beamsplitter is wavelength dependent. If the input wavelength is known to be within a specified range, the measurement of the power ratio uniquely determines the input wavelength. The device offers the advantage of trading wavelength coverage for increased resolution simply through the choice of the retarder length. Implementations of the device employing both bulk-optic components and fiber-optic components are described.

5 Claims, 16 Drawing Sheets

POLARIZATION INTERFEROMETER APPARATUS USING THE POLARIZATION DEPENDENT PHASE LAG IN A BIREFRINGENT RETARDER

FIELD OF THE INVENTION

The present invention, a polarization interferometer wavelength measuring apparatus, wavemeter, relates to optics measuring and testing, and more particularly, to the measurement of the wavelength of light using the wavelength dependent phase lag introduced by a birefringent retarder.

BACKGROUND OF THE INVENTION

With the advent of fiber-optic communication systems, particularly those which carry multiple optical signals that are differentiated by wavelength, precise measurement and control of the wavelength of light propagating in optical fibers has become important. In particular, with the development of erbium doped optical amplifiers that provide optical gain at wavelengths in the vicinity of 1.55 $\mu$m, communication systems which utilize a multiplicity of closely spaced wavelengths have been demonstrated. These wavelengths must be monitored and maintained to tight tolerances in order for these systems to operate properly.

Numerous techniques have been developed to determine the wavelength of optical signals, including the use of grating based spectrometers, interferometers, and Fourier transform spectrometers. Devices implementing these techniques can be very accurate but are often large, complex, and expensive to fabricate. They are not well suited for application as a component part of a field qualifiable device due to their size, complexity or sensitivity to environmental conditions. As a result of the limitations of the aforementioned techniques, several techniques have been developed that provide moderate wavelength accuracy, less than plus or minus 0.2 nanometers (nm), but are much less complex.

One such technique, reported by Woschnik and Behmenburg in their *Spectrochimica Acta,* article "A Wavemeter for Controlled Tuning of Near I. R. Diode Lasers," Vol. 44B, pp. 949–955 (1989), determines wavelength by measuring the wavelength dependent transmission coefficient of an optical cut-off filter, using a bulk optical color filter oriented at an angle to the incoming optical beam. Since the device which implements this technique is fabricated from bulk optical elements, alignment of these elements with respect to one another, as well as with respect to the incoming laser beam, is critical to the performance of the device. Variation in the alignment due to mechanical shock, temperature or drift in the incoming laser alignment would have deleterious effects on the wavemeter's accuracy. In addition, the cut-off wavelength of the color filter is extremely sensitive to temperature resulting in a wavelength error of 0.25 nm per degree centigrade, necessitating tight temperature control of the apparatus. Also, the off-axis orientation of the color filter would lead to wavelength error if the polarization state of the laser to be measured varied relative to the laser used during calibration of the device.

Another technique described by Dimmick and Weidner in an article entitled: "Simple, inexpensive wavemeter implemented with a fused fiber coupler," *Applied Optics,* vol. 36, pp. 1898–1901 (1997), determines wavelength by measuring the wavelength dependence of the coupling coefficient of a fused fiber coupler. Because it is implemented with fiber based devices, this technique is more rugged and does not suffer from errors which may be introduced due to variations in the alignment of the optical elements.

Another technique reported by Braasch, Holzapfel and Neuschaefer-Rube in an article entitled: "Wavelength determination of semiconductor lasers: precise but inexpensive," Optical Engineering, vol. 34, pp. 1417–1420, (1995) determines wavelength by measurement of the ratio of the wavelength dependent responsivity of two photodiodes vertically integrated on a common substrate. This involves the custom fabrication of a semiconductor photodiode. Such a device would be expensive to produce in small quantities and would require the availability of a suitable semiconductor material system to cover the wavelength range of interest. A suitable material system may not be available for all desired wavelength ranges.

All of these techniques require the manufacture of custom devices (i.e. an optical cut-off filter, edge filter, fused coupler, or double diode) that are specific to the desired wavelength range. The present invention uses the wavelength dependent phase lag between principal polarization states of a length of birefringent material (retarder) as the basis for measuring the optical wavelength and does not require the manufacture of a custom wavelength dependent element and operates at any wavelength for which the optical elements are transmissive and the detectors are responsive. The present invention may be implemented in either bulk optical component embodiments or optical fiber based component embodiments.

All embodiments of the present invention share a common advantage over the prior art. For both the bulk optical component embodiments and the optical fiber based component embodiments, the wavelength coverage is easily optimized in order to maximize the resolution, through adjustment of the length or birefringence of the birefringent retarder. In embodiments where the birefringent retarder is a length of birefringent fiber, this is accomplished by simply cleaving the fiber to the appropriate length. Since the retarder, especially in the birefringent fiber embodiments, can be made almost arbitrarily long, it is possible to achieve very high resolution. This flexibility of design and potential for high resolution are distinct advantages over the prior art.

Additionally, the birefringent fiber based embodiments share the advantages of the fused fiber coupler based wavemeter described by Dimmick and Weidner, referenced above. Because of the all fiber construction, they are not prone to mechanical misalignment, are well suited for measurement of fiber-coupled laser sources, and can be constructed from relatively inexpensive, widely available components.

SUMMARY OF THE INVENTION

In consideration of the problems detailed above and the discrepancies enumerated in the partial solutions thereto, an object of the present invention is to precisely measure the wavelength of light.

Another object of the present invention is to measure the wavelength of light using a minimum number of components which are inexpensive, and in a manner which is robust and accurate.

Another object of the present invention is to measure the wavelength of light with a compact and inexpensive system.

Another object of the present invention is to provide a compact and inexpensive wavelength measuring apparatus capable of accurate operation in an outside field environment.

Another object of the present invention is to provide a compact and inexpensive wavelength measuring apparatus wherein the wavelength coverage and resolution may be easily optimized to the specific requirements.

Another object of the present invention is to provide a compact wavelength measuring apparatus that is less susceptible than the prior art to optical element alignment errors, mechanical shock, and temperature.

Another object of the present invention is to provide a wavelength measuring apparatus that does not require the manufacture of a component specific to the wavelength range to be measured.

In order to attain the objectives described above, according to an aspect of the present invention, there is provided a polarization interferometer wavelength measuring apparatus (wavemeter). The present invention relates to a wavelength measuring apparatus capable of measuring the wavelength of light very precisely with a compact, robust, and inexpensive structure made of readily available components.

The present invention may be implemented using either bulk optical components or optical fiber based components.

The wavemeter accepts light of a known polarization or, for light of unknown polarization, accepts light through a polarizer that transmits only light of a known polarization. This light of known polarization is input into a length of birefringent material (retarder) with the fast and slow axes of the retarder oriented at an angle non-orthogonal and non-parallel to the direction of the known polarization of the accepted light and the remaining principle axis of the retarder oriented in the direction of the propagation of the light. The accepted light is thus divided into components, in-phase with each other at the point of entrance into the retarder, and polarized along the fast and slow axes of the retarder.

The wavemeter uses the wavelength dependent phase lag introduced by the birefringent retarder as a basis for measuring the optical wavelength. The phase lag is a result of the disparity in propagation velocities between the principal (fast and slow) polarization states of the retarder.

Light exiting the retarder is input into a polarizing beamsplitter, with its discrimination axis oriented at an angle non-orthogonal and non-parallel to the fast and slow axes of the retarder, which splits the light into two orthogonally polarized component outputs. The light in each of the two orthogonally polarized component outputs is detected by an optical detector and the optical power compared in a comparator. The ratio of the optical powers detected is a function of the wavelength of the accepted light.

BRIEF DESCRIPTION OF THE DRAWINGS

My invention may best be understood when reading the following specification with reference to the accompanying drawings, which are incorporated in and form a part of the specification, illustrate several embodiments of the present invention, and together with the description, serve to explain the principles of the invention. In the drawings.

DETAILED DESCRIPTION OF THE PREFERRED EMBODIMENTS

Figure 1:
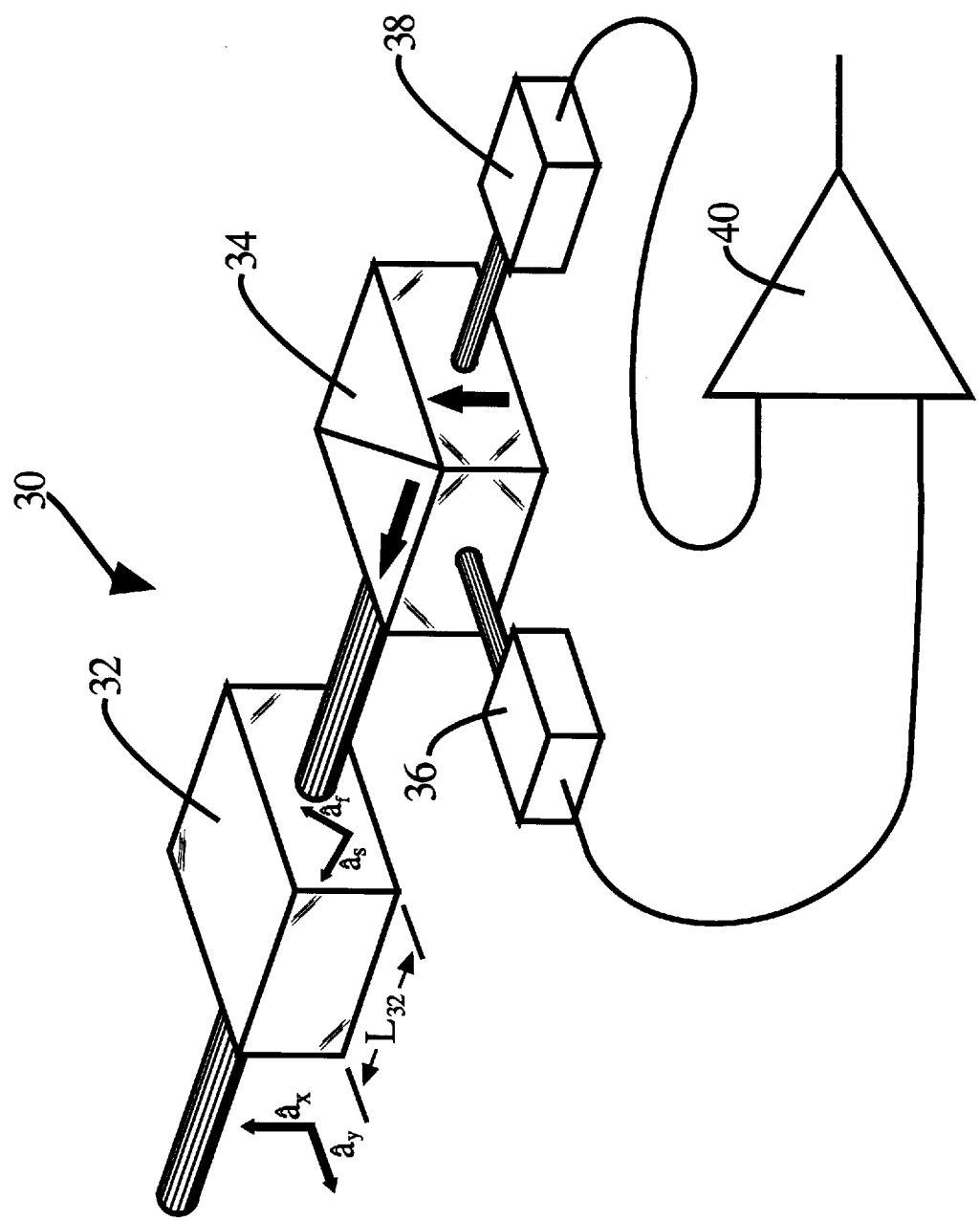
FIG. 1 is an illustration and schematic drawing of a polarization interferometer wavelength measuring apparatus (wavemeter) according to a preferred embodiment of the present invention.
Figure 2:
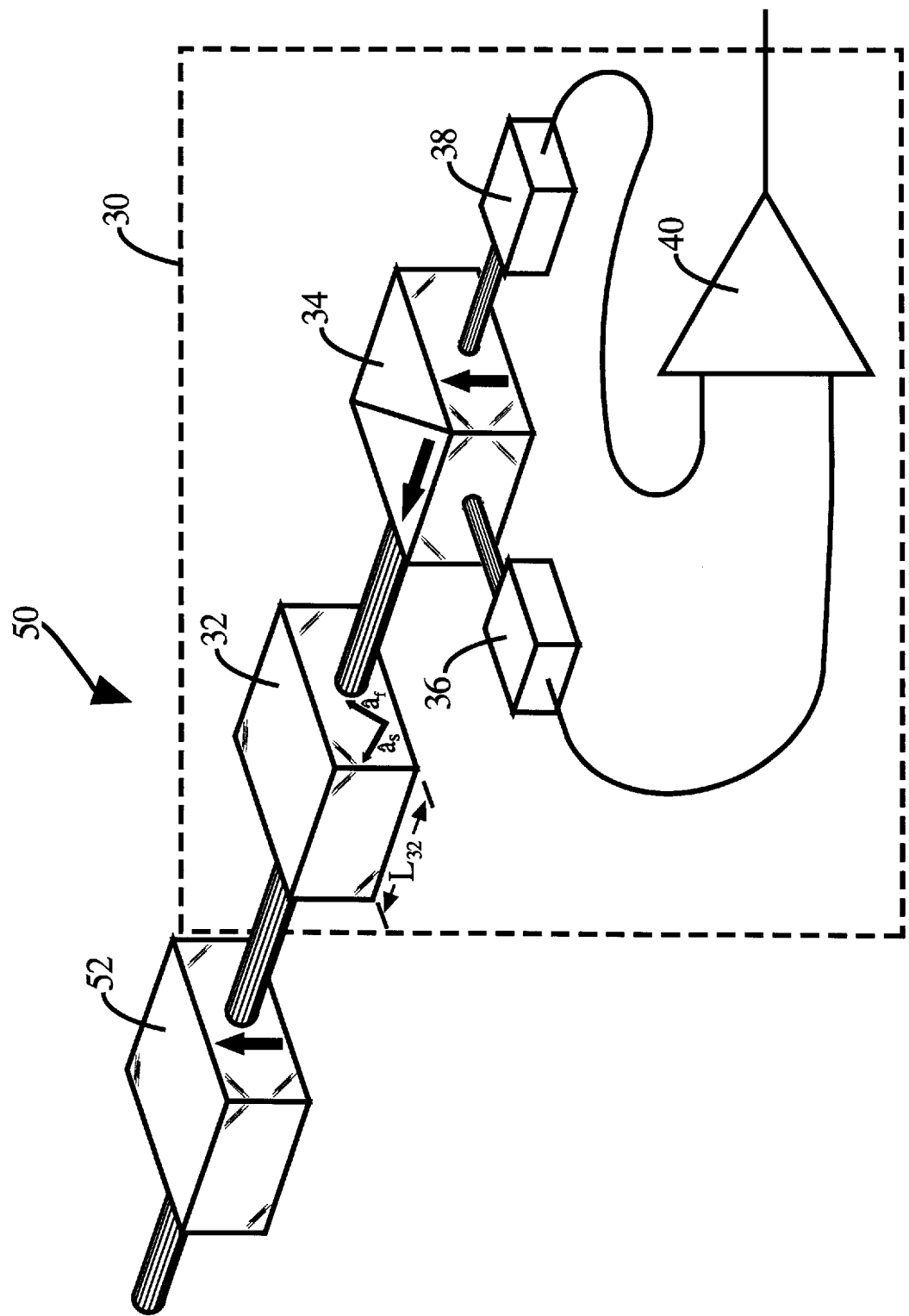
FIG. 2 is an illustration and schematic drawing of another preferred embodiment of the present invention which employs an input polarizer at the input of the wavemeter.

A block diagram of the wavemeter 30 is depicted in FIG. 1. The wavemeter 30 accepts light of a known polarization, linearly polarized in the x direction. For light of unknown polarization, a polarizing wavemeter 50, FIG. 2, uses an input polarizer 52 that transmits only the component of the light polarized in the x direction to the wavemeter 30 in FIG. 1. This polarized light, the input light for the wavemeter 30 depicted in FIG. 1, or the transmitted light from the input polarizer 52 in the polarizing wavemeter 50, FIG. 2, is input into a birefringent retarder 32 (retarder) with the principle axes of the retarder 32, the fast, $\hat{a}_f$, and slow, $\hat{a}_s$, axes, oriented at an angle non-orthogonal and non-parallel to the direction of the known polarization of the accepted light and the remaining principle axis of the retarder 32 oriented in the direction of propagation of the light.

The wavemeter 30 will operate with the fast, $\hat{a}_f$, and slow, $\hat{a}_s$, axes of the retarder 32 oriented in any direction non-orthogonal and non-parallel to the direction of the known polarization of the accepted light, but the best mode of operation is achieved with the fast, $\hat{a}_f$, and slow, $\hat{a}_s$, axes of the retarder 32 both oriented 45 degrees from the direction of the known polarization of the accepted light. This orientation provides for equal magnitudes of light polarized in the fast, $\hat{a}_f$, and slow, $\hat{a}_s$, axes of the retarder 32 and hence the potential for the greatest difference between constructive and destructive interference between the components of light exiting the fast, $\hat{a}_f$, and slow, $\hat{a}_s$, axes of the retarder 32. As will be described below, the wavemeter 30 determines the wavelength of input light by measuring the interferences between the fast, $\hat{a}_f$, and slow, $\hat{a}_s$, components of light exiting the retarder 32, hence, by maximizing the possible interference greater wavemeter 30 resolution is obtained.

The following detailed description uses an exemplar embodiment where the fast, $\hat{a}_f$, and slow, $\hat{a}_s$, axes of the retarder 32 are both oriented 45 degrees from the direction of the known polarization of the accepted light but it will be appreciated by those skilled in the art that other orientations of the retarder 32 are possible.

In this embodiment where the fast, $\hat{a}_f$, and slow, $\hat{a}_s$, axes of the retarder 32 are both oriented 45 degrees from the direction of the known polarization of the accepted light, the incoming light at the point of entrance into the retarder 32 is thus divided into components polarized along the fast and slow axes with equal amplitude and phase. As a consequence of the birefringence of the retarder 32, propagation through the length, $L_{32}$, of the retarder 32 results in a phase difference, $\Gamma$, between the light polarized along the fast, $\hat{a}_f$, and slow, $\hat{a}_s$, axes. The phase difference is given by $$\Gamma = 2\pi \frac{\Delta n_{32} L_{32}}{\lambda}, \quad (1)$$

where $\lambda$ is the wavelength of the light in vacuum, and $\Delta n_{32}$ is the birefringence of the retarder 32 and is equal to $n_s - n_f$, where $n_f$ and $n_s$ are the indices of refraction for light polarized along the fast and slow axis respectively.

Light exiting the retarder 32 is input to a polarizing beamsplitter 34. The polarizing beamsplitter 34 divides the incoming light into two orthogonally polarized components that are linearly polarized along the principal axes of the polarizing beamsplitter 34. While the principal axes of the polarizing beamsplitter 34 can be oriented at any non-orthogonal and non-parallel angle to the fast, $\hat{a}_f$, and slow, $\hat{a}_s$, axes of the retarder 32, in this exemplar embodiment the polarizing beamsplitter 34 is oriented such that components of the light polarized in the $\hat{x}$ direction are directed to a first output port while components of the light polarized in a direction orthogonal to the $\hat{x}$ direction, the $\hat{y}$ direction, are directed to a second output port. The optical power, $P_1$, exiting the polarizing beamsplitter's 34 first output port and the optical power, $P_2$, exiting the second output port are detected by a first and a second photodetector, 36 and 38 respectively, producing corresponding photocurrents. The photocurrents produced by the photodetectors, 36 and 38, are input to comparator means (comparator) 40 which compares the photocurrents and produces an output signal, corresponding to the ratio of the photocurrent produced by the first photodetector 36 to the photocurrent produced by the second photodetector 38, which, in turn, corresponds to the wavelength of the accepted light.

In my exemplar embodiment the comparator 40 is a log-ratio amplifier that produces an output voltage, $V_{40}$, which corresponds to the wavelength of the accepted light such that $$V_{40} = G_{40} \log_{10}\left(\frac{R_{36} P_1}{R_{38} P_2}\right), \quad (2)$$

where $G_{40}$ is the amplifier gain, $R_{36}$ and $R_{38}$ are the responsivities of photodetectors 36 and 38 respectively, and $P_1$ and $P_2$ are the optical powers exiting the polarizing beamsplitter's 34 first and second output port respectively.

The optical powers exiting the polarizing beamsplitter 34 are determined using Jones Matrices. Assuming that the wavemeter's 30 accepted light is linearly polarized in the x direction with complex amplitude $A_{ix}$ of the electric field, the complex amplitudes, $A_{ox}$ and $A_{oy}$, of the optical wave exiting the retarder 32 are given by the following relation:

$$\begin{bmatrix} A_{ox} \\ A_{oy} \end{bmatrix} = \begin{bmatrix} (e^{-j\Gamma} + 1)/2 & (e^{-j\Gamma} - 1)/2 \\ (e^{-j\Gamma} - 1)/2 & (e^{-j\Gamma} + 1)/2 \end{bmatrix}. \quad (3)$$

The optical power, $P_1$, exiting the polarizing beamsplitter's 34 first output port and the optical power, $P_2$, exiting the second output port are proportional to the magnitude squared of the complex amplitudes, $A_{ox}$ and $A_{oy}$, such that:

$$P_1 \propto A_{ox} A^*_{ox} \quad (4)$$

and $$P_2 \propto A_{oy} A^*_{oy} \quad (5)$$

Substituting Equations 3, 4, and 5 into Equation 2, the output voltage, $V_{40}$, of the wavemeter 30 is expressed as a function of the retardance $\Gamma$, such that:

$$V_{40} = G_{40} \log_{10}\left(\frac{R_{36}(1 - \cos\Gamma)}{R_{38}(1 + \cos\Gamma)}\right). \quad (6)$$

Figure 3:
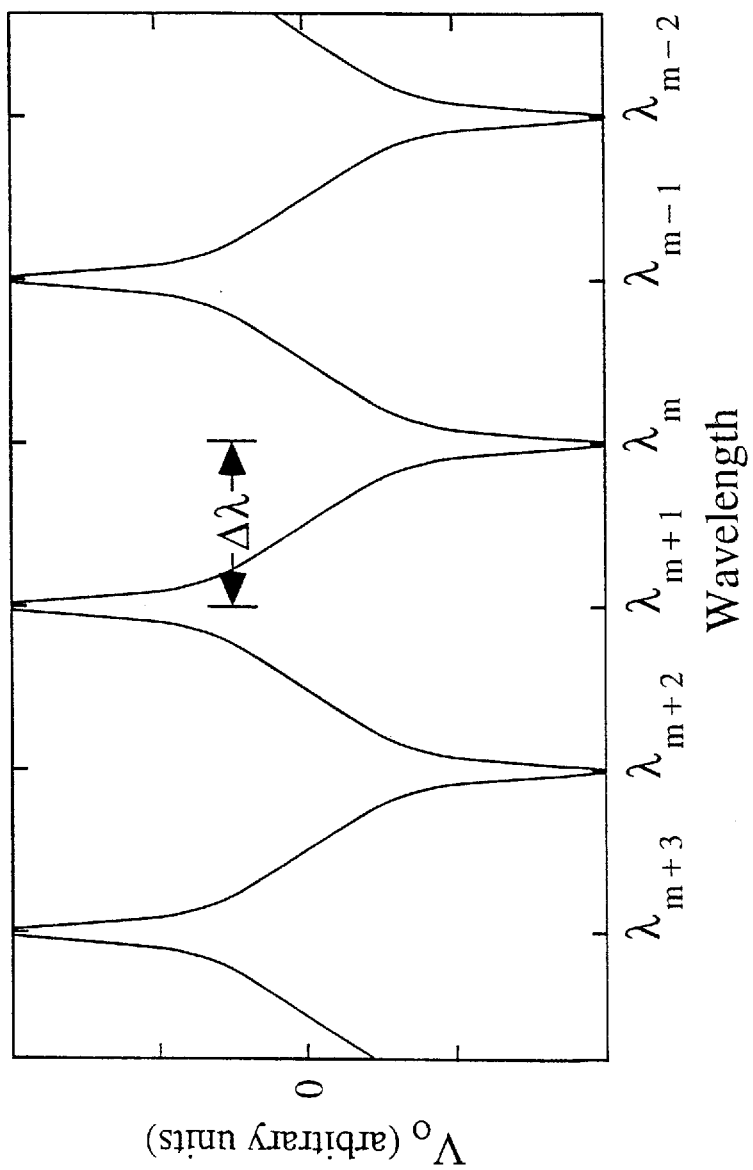
FIG. 3 graphically illustrates the output voltage of the present invention as a function of the wavelength of the light input for measurement.

$V_{40}$ is plotted as a function of accepted light wavelength in FIG. 3. For the plot it is assumed that $R_{36} = R_{38}$. Equation 6 has singularities at wavelengths $\lambda_m$, given by $$\lambda_m = 2\Delta n_{32} L_{32}/m \quad (7)$$

where m is an integer. If the wavelength of the light to be measured is known to be within a bandwidth $\Delta \lambda_m$, between singularities $\lambda_m$ and $\lambda_{m+1}$, such that:

$$\Delta \lambda_m = \lambda_m - \lambda_{m+1} = \frac{2\Delta n_{32} L_{32}}{m(m+1)} \quad (8)$$

then the wavelength of the light to be measured can be inferred from the comparator output voltage, $V_{40}$, since, within that range, Equation 6 is smooth and monotonic.

The bandwidth of the wavemeter 30, as well as, the absolute wavelengths of the singularities are determined by the product of the birefringence and the length, $L_{32}$, of the retarder 32 and as such are at the discretion of the designer. When $\Delta\lambda$ is much less than the nominal wavelength $\lambda$ and where m is large, such that m(m+1) approximates $m^2$, a simple expression for the bandwidth of the wavemeter is found by combining Equations 7 and 8 to eliminate m, such that:

$$\Delta\lambda = \frac{\lambda^2}{2L_{32}\Delta n_{32}}. \qquad (9)$$

The resolution of the wavemeter 30 will in large measure be determined by the slope of the comparator means 40 output voltage, $V_{40}$, versus wavelength given by Equation 6. The minimum slope occurs at the center of the wavemeter bandwidth where the phase difference, $\Gamma$, between the light polarized along the fast, $\hat{a}_f$, and slow, $\hat{a}_s$, axes of the retarder 32 is given by:

$$\Gamma = (m + \frac{1}{2})\pi \qquad (10)$$

The magnitude of the minimum slope is found by differentiating Equation 6 and substituting Equation 10 for $\Gamma$, which yields:

$$\left|\frac{dV_{40}}{d\lambda}\right|_{min} = G_{40}\frac{4\pi \log_{10}(e)\Delta n_{32}L_{32}}{\lambda^2}. \qquad (11)$$

Equation 11 indicates that the slope of the output voltage, $V_{40}$, versus wavelength, and hence the resolution of the wavemeter 30, may be increased by increasing the product $\Delta n_{32}L_{32}$. Unfortunately, increasing $\Delta n_{32}L_{32}$ also has the deleterious effect of reducing the wavemeter's 30 bandwidth, $\Delta\lambda$, and so a trade-off exists between resolution and bandwidth. Since in most instances the wavelength of the light to be measured is known to be within a certain range, the wavemeter 30 resolution can be maximized by properly choosing $\Delta n_{32}L_{32}$ to provide no more than the required bandwidth.

The wavemeter 30 and polarizing wavemeter 50 may be implemented using either bulk optical components or optical fiber based components. In embodiments where the polarizing wavemeter 50 is implemented with bulk-optical elements, FIG. 4, the input polarizer 52 of the polarizing wavemeter 50 may be implemented either as an absorption type device, a birefringent prism, or as shown in the bulk optic polarizing wavemeter 60 in FIG. 4, a first beam displacing polarizing beamsplitter 66 with a beam stop 68 on the undesired polarization output. The beam stop 68 absorbs or deflects the light impinging on it so as to prevent that light from disrupting the operation of the wavemeter.

Figure 4:
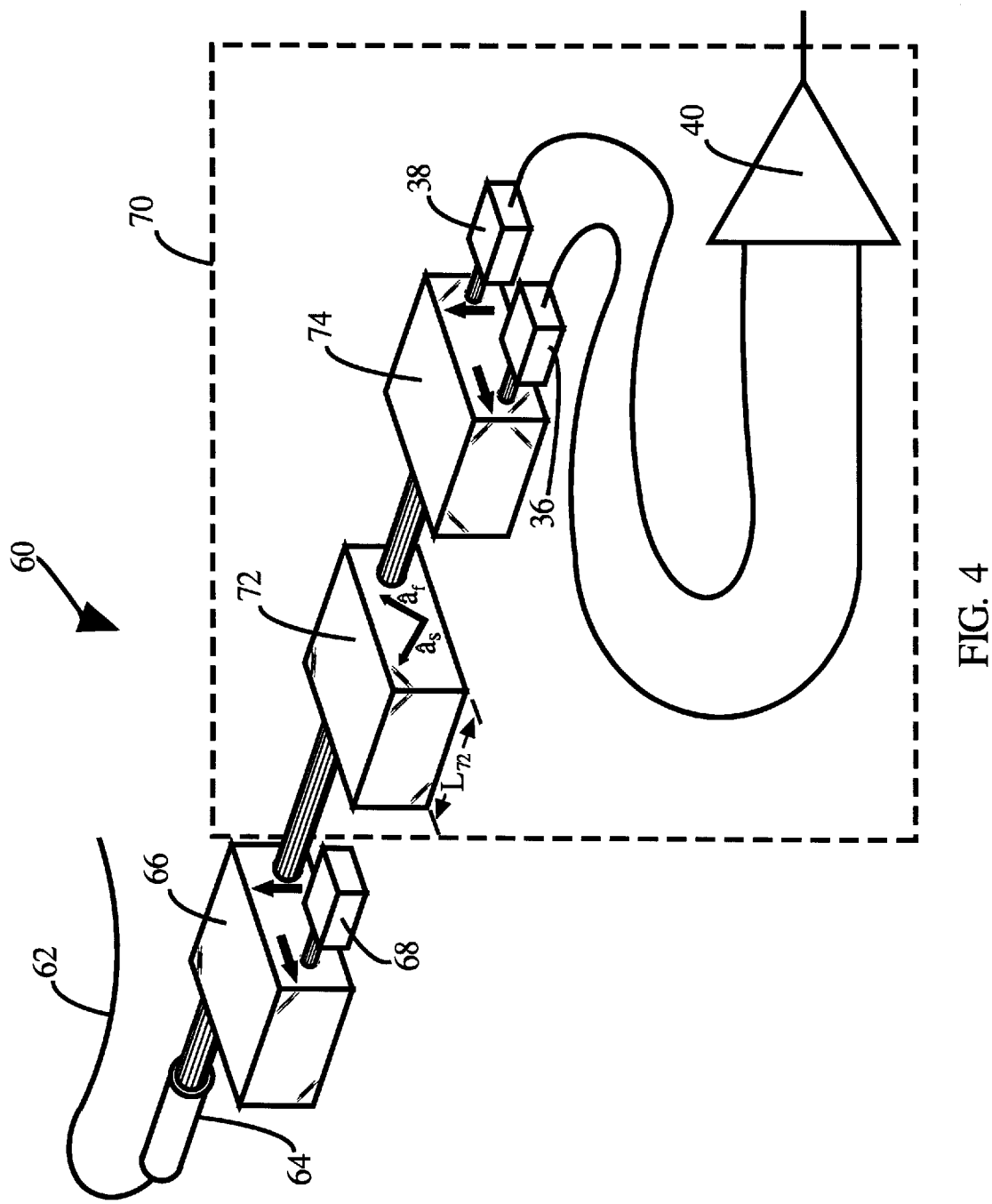
FIG. 4 is an illustration and schematic drawing of another preferred embodiment of the present invention, implemented with bulk optics, which employs an optical collimator to collimate the input light.

The wavemeter 30 may be implemented in a bulk-optical elements embodiment such as the bulk optic wavemeter 70 in FIG. 4. In the bulk optic wavemeter 70 embodiment the bulk optic retarder 72 is fabricated from a birefringent material, such as quartz, lithium niobate, or calcite and the wavemeter 30 polarizing beamsplitter 38 is implemented as a second beam displacing polarizing beamsplitter 74. The optical input to the device shown is accomplished via a single mode fiber 62 fitted with a collimator 64. The collimator 64 accepts the diverging beam as it exits the single mode fiber 62 and creates a columnar beam that is essentially non-diverging over the length of the bulk optic wavemeter 70. The length of the retarder 72 is chosen based on the birefringence of the material and calculations of Equation 9 needed to achieve the desired bandwidth, $\Delta\lambda$. As an illustration of the design procedure, consider an application wherein a wavemeter is to be used for channel identification or wavelength stabilization within a dense wavelength division multiplexed (DWDM) communication system. Assume that it is known that the wavelength to be measured is found within a 20 nm bandwidth centered about 1555 nm. Setting $\Delta\lambda$ equal to 20 nm and solving Equation 9 for the required retardance yields a $L\Delta n$ of 60.5 $\mu$m. The center of the wavemeter bandwidth can be fine tuned by slight rotation of the retarder about an axis normal to the propagation of the light.

If the state of polarization of the input light to the polarizing wavemeter 50 is unknown or is time varying, the possibility exists for a condition, termed polarization fading, in which the state of polarization of the input light has a significant component orthogonal to that passed by the input polarizer 52. Although the polarizing wavemeter 50 is fairly insensitive to variations in the input power, if the power transmitted through the input polarizer 52 were to drop below the sensitivity of the photodetectors 36 and 38 a false wavelength reading would be produced. This problem may be addressed in several ways.

If the input polarization is not time varying, a polarization controller inserted prior to the polarizing wavemeter 50 could be used to transform the input polarization state into a state that is passed by the input polarizer 52. This could be as simple as rotating a connector. On the other hand, if the input polarization state is time varying, a polarization modulator inserted prior to the polarizing wavemeter 50 could be used to modulate the polarization state of the incoming light. Provided the modulation rate is faster than the response time of the photodetectors 36 and 38, the polarizing wavemeter 50 will respond to the average power transmitted by the input polarizer 52.

Figure 5:
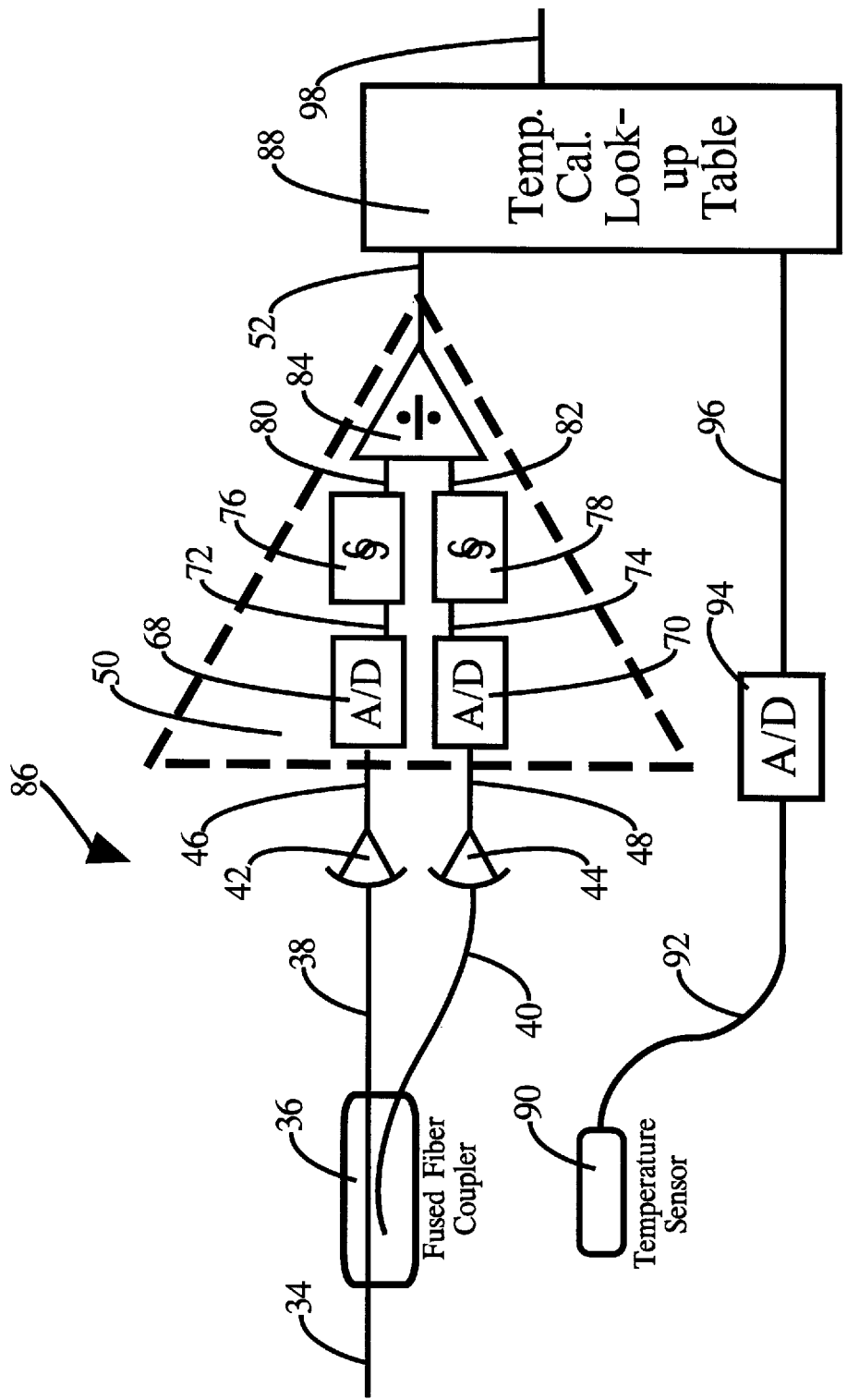
FIG. 5 is an illustration and schematic drawing of another preferred embodiment of the present invention which employs an electrically controllable birefringent element prior to the first polarizing beamsplitter to continually adjust the polarization of the input light in a system where the polarization of the input light might vary with time.

Alternatively, a polarization tracking wavemeter 80 may be employed such as that illustrated in FIG. 5. This polarization tracking wavemeter embodiment 80 is a modification of the polarizing wavemeter 50 depicted in FIG. 4 with the addition of an electrically controllable birefringent element such as a liquid crystal variable retarder (LCVR) 82 prior to the first polarizing beamsplitter 66 and a undesired polarization output photodetector 84 in place of the beam stop 68. The LCVR 82 is oriented such that its principal axes are about 45 degrees to the principal axes, $\hat{a}_f$ and $\hat{a}_s$, of the first polarizing beamsplitter 66. The output of the undesired polarization output photodetector 84 photocurrent is input to a power minimizing means 86 which continuously adjusts the retardance of the LCVR 82 so as to minimize the power detected by the undesired polarization output photodetector 84. Provided the LCVR 82 has sufficient variable retardance, this embodiment will ensure that the loss introduced by the first polarizing beamsplitter 66 will not exceed 3 dB regardless of the state of polarization of the input optical signal.

Figure 6:
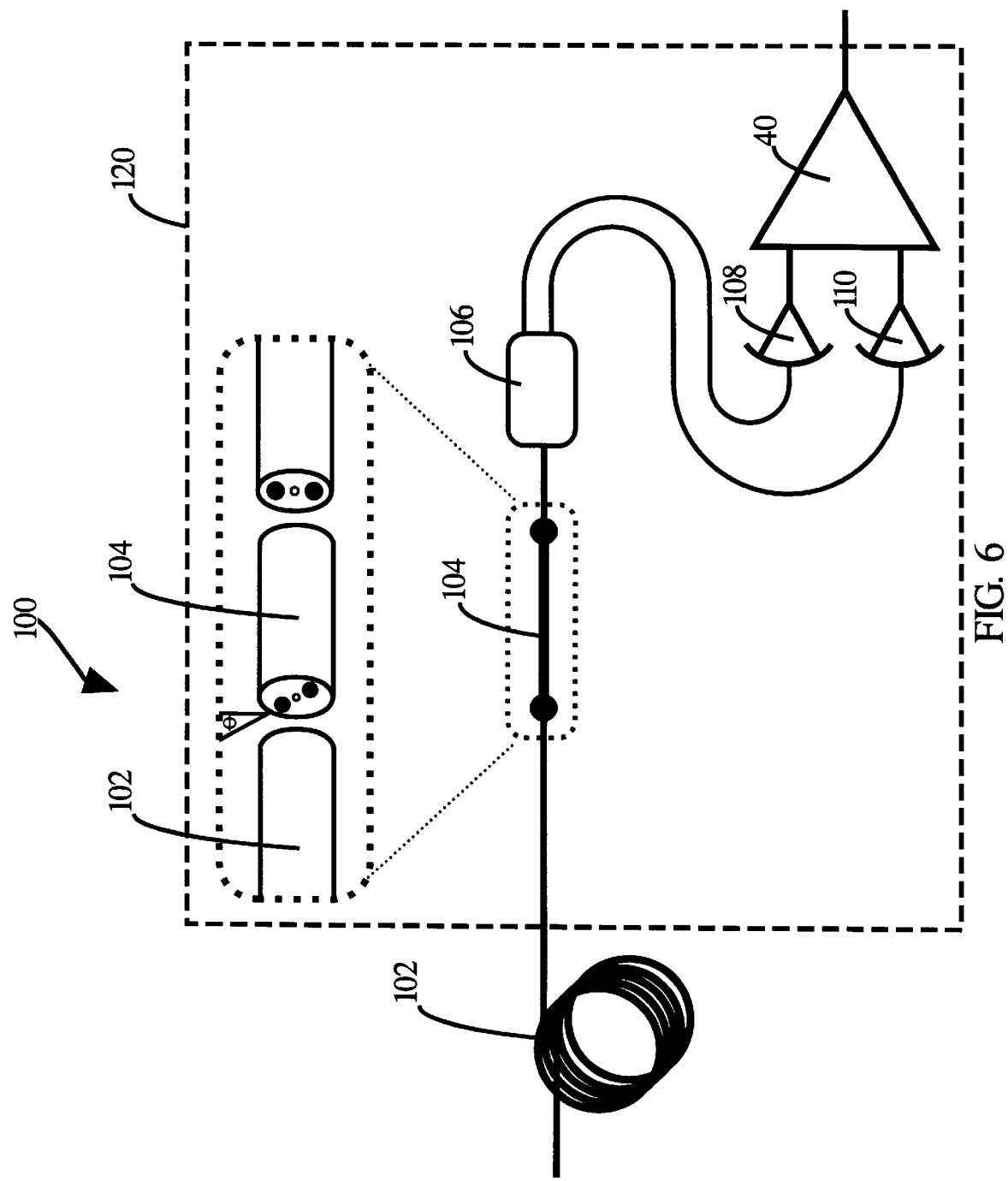
FIG. 6 is an illustration and schematic drawing of another preferred embodiment of the present invention implemented using fiber optic components.

The wavemeter 30 and polarizing wavemeter 50 can be implemented in fiber embodiments such as the optical fiber wavemeter 120 and fiber optical polarizing wavemeter 100 shown in FIG. 6. In embodiments where the polarizing wavemeter 50 is implemented with optical fiber elements, the input polarizer 52 of the polarizing wavemeter 50 is implemented as a length of polarizing fiber 102, of sufficient length to ensure adequate polarization of the input light. Polarizing fiber is optical fiber which transmits light polarized along a preferred axis with low loss. Light polarized orthogonally to the preferred axis is subject to high loss.

In the optical fiber wavemeter 120 embodiment the retarder is a length of birefringent fiber forming a birefringent fiber retarder 104 and the polarizing beamsplitter 106 is an all fiber device. The photodetectors, 36 and 38, are implemented in the optical fiber wavemeter as fiber coupled photodiodes, 108 and 110.

Assembly of the optical fiber wavemeter 120 is accomplished by cleaving the birefringent fiber to a length appropriate for the application and assembling the components by fusion splicing. A fusion splicer capable of rotating at least one of the two fibers is required so that the principal axes of the components can be properly aligned. This implementation has the advantage of comparative ease of assembly and greater flexibility in the choice of the retarder length through the choice of the length of birefringent fiber 104.

Because it is envisioned that the wavemeter 30 may find application in a field environment, it is important to understand how variations in the environment might affect its accuracy. Of chief concern is the potential error introduced by a variation in temperature, the dominant affect of which is to shift the wavemeter 30 response, plotted in FIG. 3, along the wavelength axis. Referring to Equation 7, we observe that any change in the retardance will result in a change in the locations of the singularities. The wavelength error ($\delta\lambda$) introduced by small variations in temperature ($\delta T$) is found by differentiating Equation 7 with respect to temperature. Carrying out the derivative yields:

$$\delta\lambda = 2m \left[ \frac{d\Delta n}{dT} L + \Delta n \alpha L \right] \delta T, \quad (12)$$

$$\alpha = \left( \frac{1}{L} \right) \frac{dL}{dT}, \text{ and} \quad (13)$$

$$\frac{d\Delta n}{dT} = \frac{dn_s}{dT} - \frac{dn_f}{dT}, \quad (14)$$

where $\alpha$ is the thermal expansion coefficient and $dn_f/dT$ and $dn_s/dT$ are the thermo-optic coefficients of the retarder 32. The quantity in brackets is the temperature dependence of the retardance. Assuming that m is large, or equivalently that $\Delta\lambda<<\lambda$, with the aid of Equations 8 and 9, Equation 12 can be rewritten as $$\delta\lambda = \lambda F \delta T, \text{ and} \quad (15)$$

$$F = \frac{d(\Delta nL)/dT}{\Delta nL} = \frac{1}{\Delta nL} \frac{d(\Delta n)}{dT} + \alpha, \quad (16)$$

where F is a figure of merit that provides a measure of the temperature dependence of the retardance.

Several candidate retarder 32 materials' figures of merit and birefringences are: for Calcite F=$-66.3 \times 10^{31\ 6}$ (K$^{-1}$) and $\Delta n$=0.1565; for Lithium Niobate F=$=443 \times 10^{-6}$ (K$^{-1}$) and $\Delta n$=0.0732; and for Quartz F=$-53.2 \times 10^{-6}$ (K$^{-1}$) and $\Delta n$=0.0122, respectively. It should be noted that the wavelength error is independent of the retarder length and that, of the materials listed, quartz is the least temperature sensitive. It is also clear from the figures of merit that, even using a quartz retarder, temperature variation of only a few degrees centigrade can cause significant wavelength error. This problem may be addressed in several ways. The most straight forward solution is to temperature stabilize the retarder.

The temperature sensitivity of the wavemeter 30 is due to the fact that the retardance of the retarder 32 may vary with temperature as a result of changes in its physical length and its birefringence with temperature. Perhaps the most elegant solution to the temperature dependency of the wavemeter 30 is to construct the retarder 32 from two different birefringent materials. With the proper choice of orientation and length of the two birefringent materials it is possible to construct the wavemeter 30 wherein the retarder 32 is composed of two differing birefringent materials with lengths chosen such that the total retardance of the resulting combination retarder 130 is that required to achieve the desired $\neq\lambda$ but the net dependence of the retardance of the pair of constituent retarders, 132 and 134, on temperature is zero. The constituent retarders, 132 and 134, are oriented such that a shift in temperature causes an increase in retardance of one of the retarders that is exactly canceled by a decrease in retardance of the other retarder.

Figure 7:
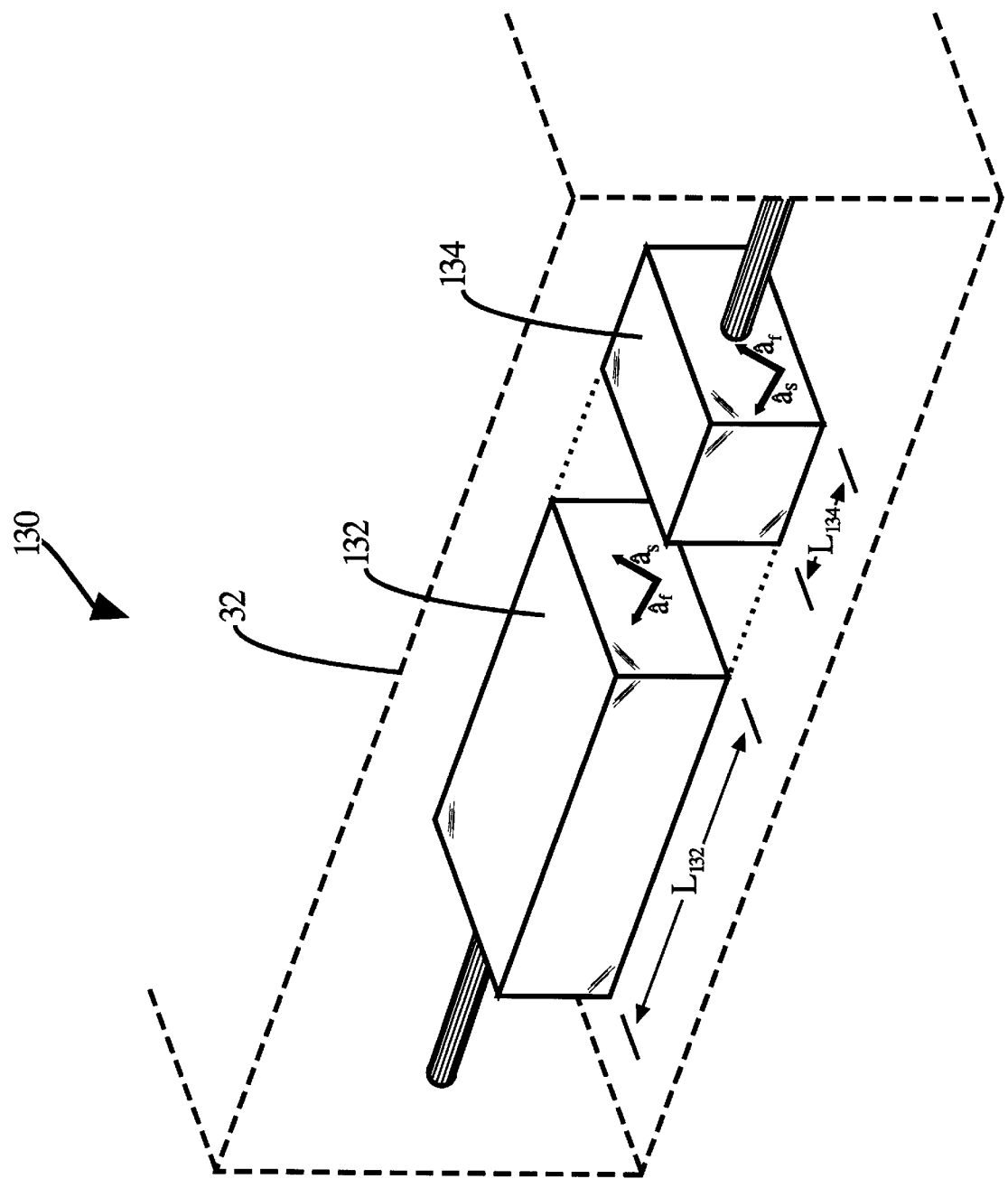
FIG. 7 is an illustration and schematic drawing of another preferred embodiment of the present invention which employs a two retarder combination to correct for temperature.

Consider the exemplar two crystal retarder combination 130 shown in FIG. 7. The crystal retarders, 132 and 134, are oriented such that their fast axes are orthogonal. Carrying out an analysis similar to the one that led to Equations 15 and 16, an equivalent figure of merit, $F_{eq}$, for the two crystal retarder combination is derived:

$$F_{eq.} = \frac{\Delta n_{132} L_{132} F_{132} - \Delta n_{134} L_{134} F_{134}}{\Delta n_{132} L_{132} - \Delta n_{134} L_{134}}. \quad (17)$$

In Equation 16, $\Delta n_{132}$ and $L_{132}$ are the birefringence and length of the first crystal retarder 132, $\Delta n_{134}$ and $L_{134}$ are the birefringence and length of the second crystal retarder 134 and $F_{132}$ and $F_{134}$ are the figure of merit of the first 132 and second 134 crystal retarders, respectively. $F_{eq}$ is zero when $$\frac{L_{132}}{L_{134}} = \frac{\Delta n_{134} F_{134}}{\Delta n_{132} F_{132}}. \quad (18)$$

Equation 18 yields positive retarder lengths only when $\Delta n_{132} F_{132}$ and $\Delta n_{134} F_{134}$ are of like sign. The crystal retarder lengths, $L_{132}$ and $L_{134}$, are completely specified by adding the requirement that the total retardance of the two crystal retarder combination 130 produce the desired $\Delta\lambda$.

The bandwidth of the wavemeter 30, when implemented with the two retarder combination 130, is given by:

$$\Delta\lambda = \frac{\lambda^2}{2(\Delta n_{132} L_{132} - \Delta n_{134} L_{134})}. \quad (19)$$

Solving Equation 18 and Equation 19 for $L_{132}$ and $L_{134}$ yields:

$$L_{132} = \frac{\lambda^2}{2\Delta\lambda} \left[ \frac{1/\Delta n_{132}}{1 - F_{132}/F_{134}} \right], \text{ and} \quad (20)$$

$$L_{134} = \frac{\lambda^2}{2\Delta\lambda} \left[ \frac{1/\Delta n_{134}}{F_{134}/F_{132} - 1} \right]. \quad (21)$$

Returning to the DWDM example, with the aid of Equations 20 and 21 a two crystal retarder combination 130 can be constructed with $\Delta\lambda$=20 nm and a center wavelength of 1555 nm using a 1.57 mm long piece of calcite and a 25.1 mm long piece of quartz.

Figure 8:
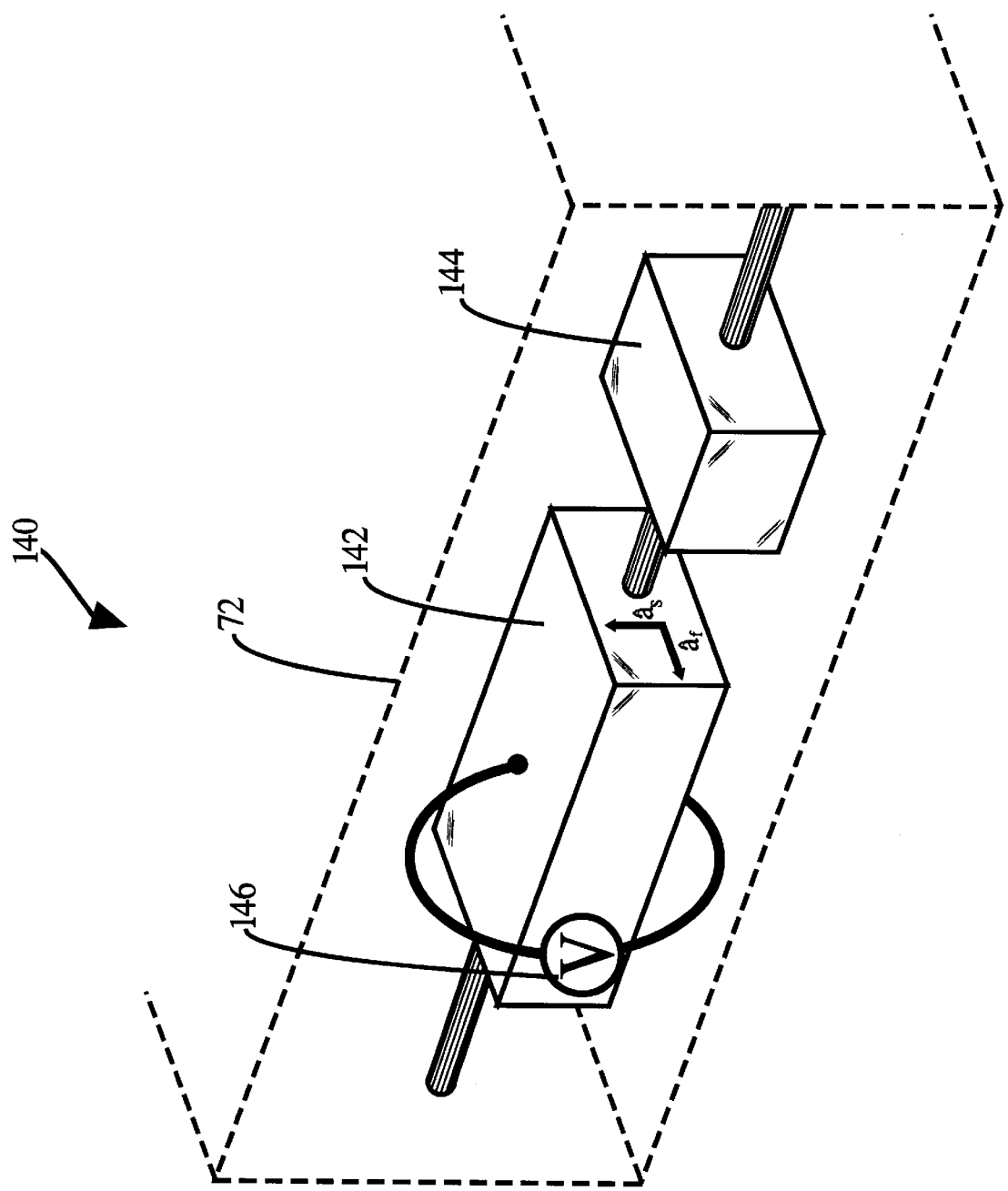
FIG. 8 is an illustration and schematic drawing of a bulk optical embodiment of the wavemeter which uses an adjustable retarder.

The wavemeter 30 may also be fabricated using a birefringent retarder 32 which is adjustable in its retardance either through electrical, mechanical, or thermal means. In an adjustable retardance bulk optical wavemeter 140, see FIG. 8, the bulk optic retarder 72 may be adjustable in retardance, and contain both a bulk optical adjustable retarder 142 and a fixed bulk optical retarder 144 to provide fine adjustment of the voltage versus wavelength characteristic. The bulk optical adjustable retarder 142 can be made from a birefringent material which is also electro-optic such as LiNbO$_3$ or a liquid crystal. The total retardance of this bulk optic retarder 72 may then be varied by application of an electric field from a bulk optical adjustable retarder voltage source 146, which has the effect of changing ($n_2-n_f$).

Figure 9:
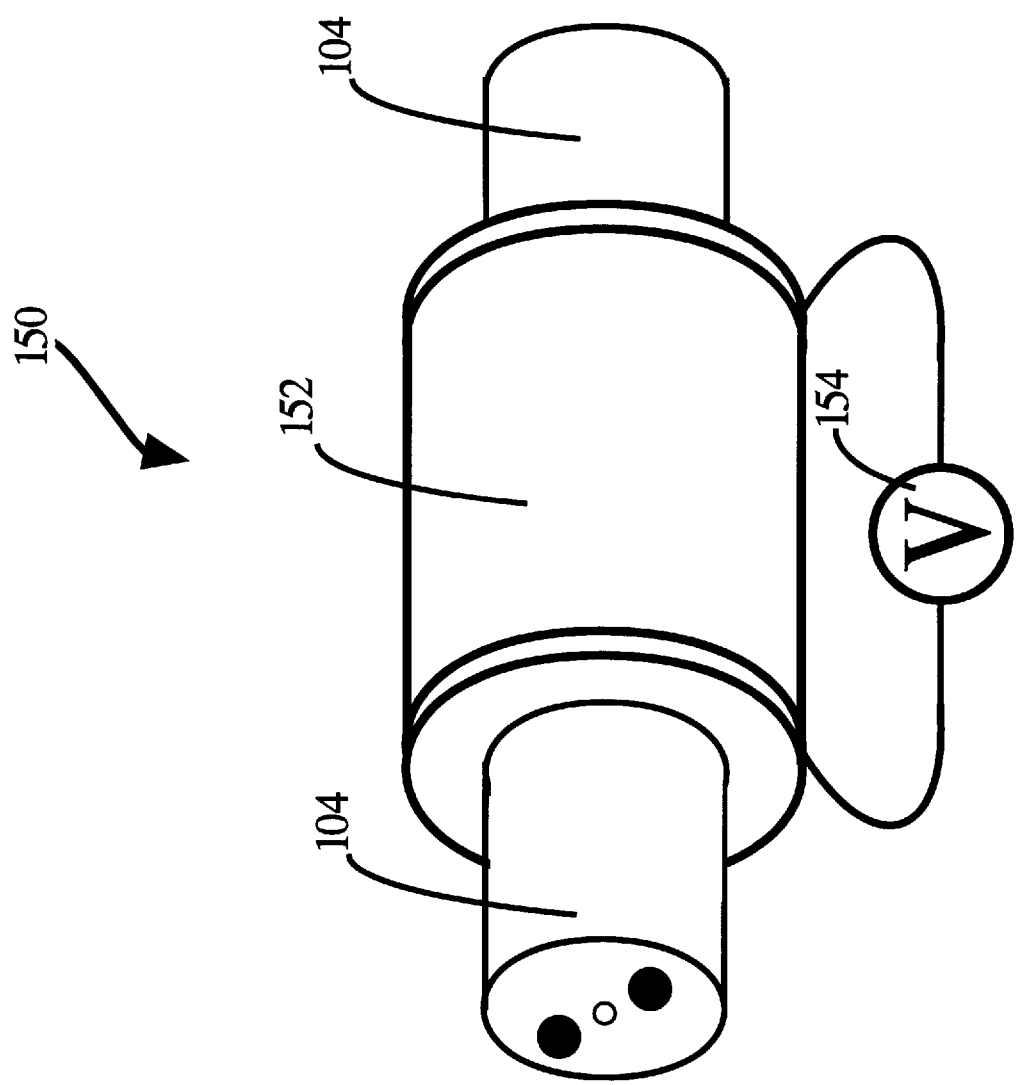
FIG. 9 is an illustration and schematic drawing of a optical fiber embodiment of the wavemeter which uses an adjustable retarder.

The retardance of a birefringent fiber retarder 104 may be made adjustable by stretching or compressing the birefringent fiber retarder 104 through a stretching or compressing means, see FIG. 9. This adjustable birefringent fiber retarder 150 can be implemented using a piezoelectrical device 152 as the stretching or compressing means. The piezoelectrical device 152 stretches or compresses the birefringent fiber retarder 104 longitudinally as a result of application of a voltage from a piezoelectrical voltage source 154. Additionally, the retardance of both the bulk optic and fiber retarders can be adjusted by adjusting the temperature of the retarder.

Figure 10:
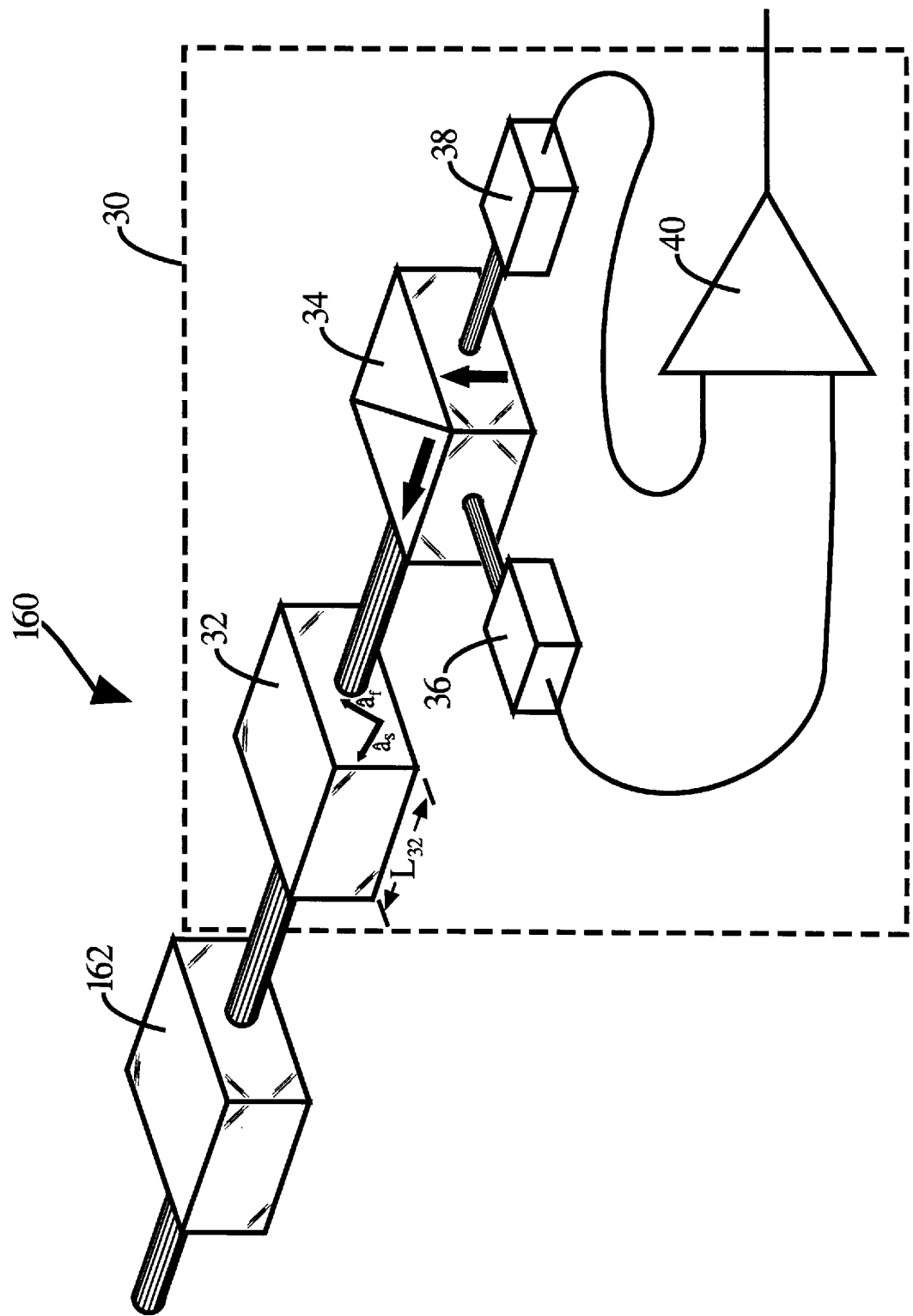
FIG. 10 is an illustration and schematic drawing of a polarization interferometer wavelength measuring apparatus embodiment which employs an optical isolating element at the input to the wavemeter.
Figure 11:
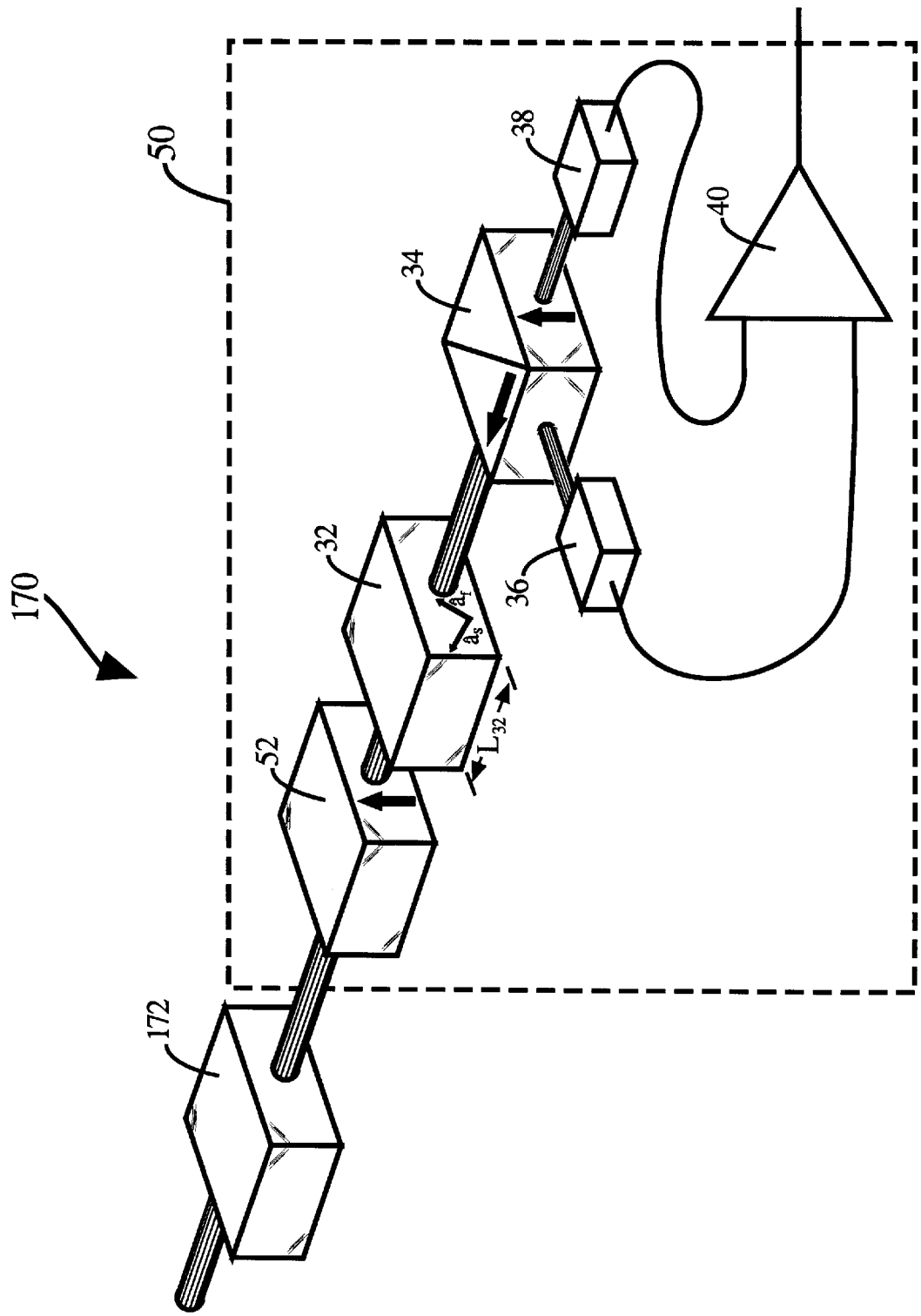
FIG. 11 is an illustration and schematic drawing of a polarization interferometer wavelength measuring apparatus embodiment which employs an optical isolating element and a polarizer at the input to the wavemeter.

As shown in FIGS. 10 and 11, an optical isolator, 162 and 172 respectively, may be included in the optical path of an optically isolated wavemeter 160, and optically isolated polarizing wavemeter 170, prior to the input to the wavemeter 30, and polarizing wavemeter 50, to eliminate reflections from the wavemeter 30, and polarizing wavemeter 50, which may destabilize the optical source being measured.

Figure 12:
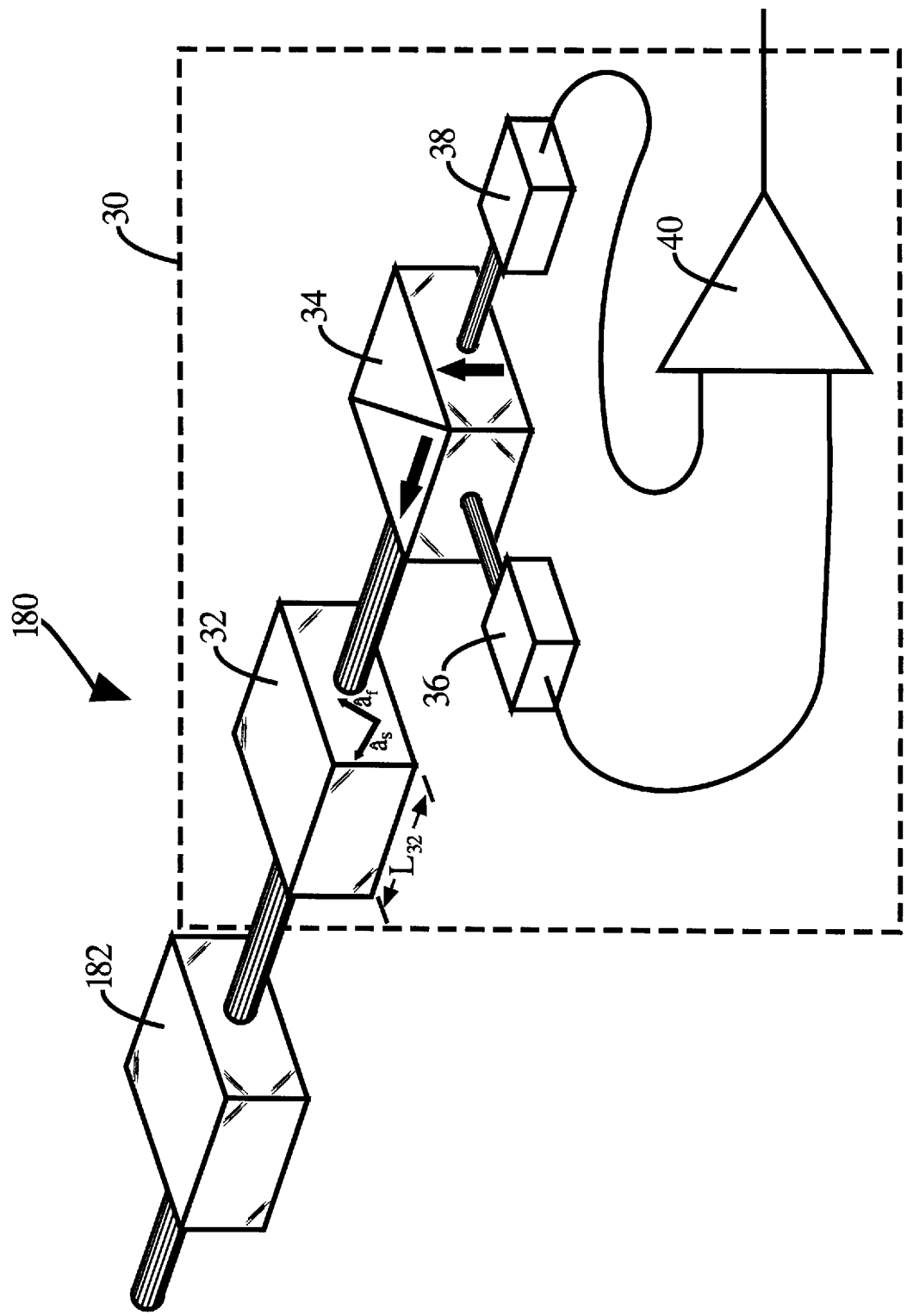
FIG. 12 is an illustration and schematic drawing of a polarization interferometer wavelength measuring apparatus embodiment which employs a bandpass filter at the input to the wavemeter.
Figure 13:
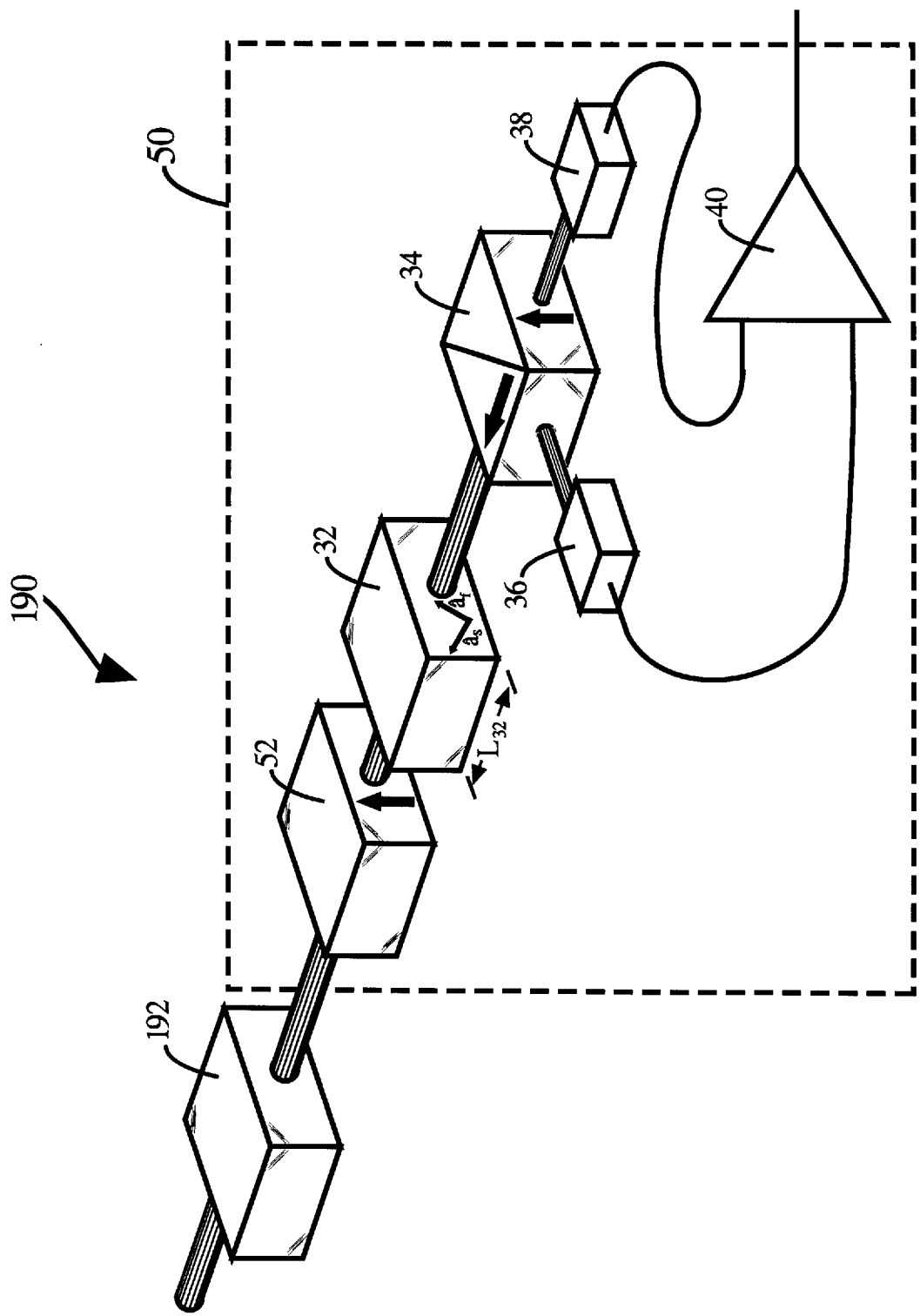
FIG. 13 is an illustration and schematic drawing of a polarization interferometer wavelength measuring apparatus embodiment which employs a bandpass filter and a polarizer at the input to the wavemeter.

As shown in FIGS. 12 and 13, an optical bandpass filter, 182 and 192 respectively, of bandwidth $B_f < \Delta\lambda$, may be included in the optical path of a bandpass filtered wavemeter 180, and bandpass filtered polarizing wavemeter 190, prior to the input to the wavemeter 30, and polarizing wavemeter 50. If the wavelength range restriction induced by the optical bandpass filter, 182 and 192, is acceptable, the optical bandpass filter, 182 and 192, will improve the accuracy of the wavemeter 30, and polarizing wavemeter 50, in determining peak wavelength when the signal consists of a spectrally narrow source combined with a spectrally broad component as is often the case with optically amplified signals.

Figure 14:
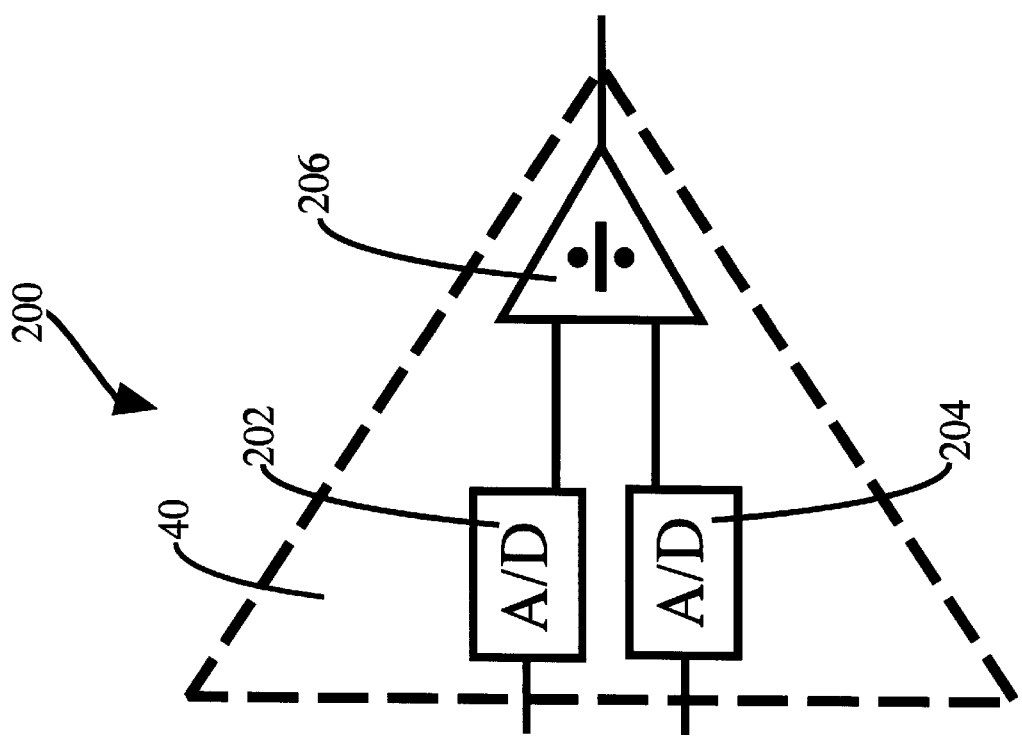
FIG. 14 is a schematic drawing of the comparator of the wavemeter, according to another embodiment of the present invention, which employs analog to digital conversion of the output of the optical photodetectors and digital computation of the power ratios.

In another embodiment of the present invention, as an alternative to the use of a log-ratio amplifier to form the ratio of the photocurrents produced by photodetectors, 36 and 38, shown schematically in FIG. 14, the comparator means 40 are implemented using the digital techniques of a digital comparator 200. In this embodiment, the photocurrent from the first photodetector 36 and the photocurrent from the second photodetector 38 are respectively connected to a first 202 and a second 204 analog-to-digital (A/D) converter which digitize the first and second photocurrents and produces digitized photocurrent outputs. The respective digitized photocurrent outputs are then digitally compared by digital comparing means 206 which produces a signal on its output corresponding to the ratio of the first photodetector 36 to second photodetector 38 photocurrents. This ratio corresponds to the wavelength of the input light.

Figure 15:
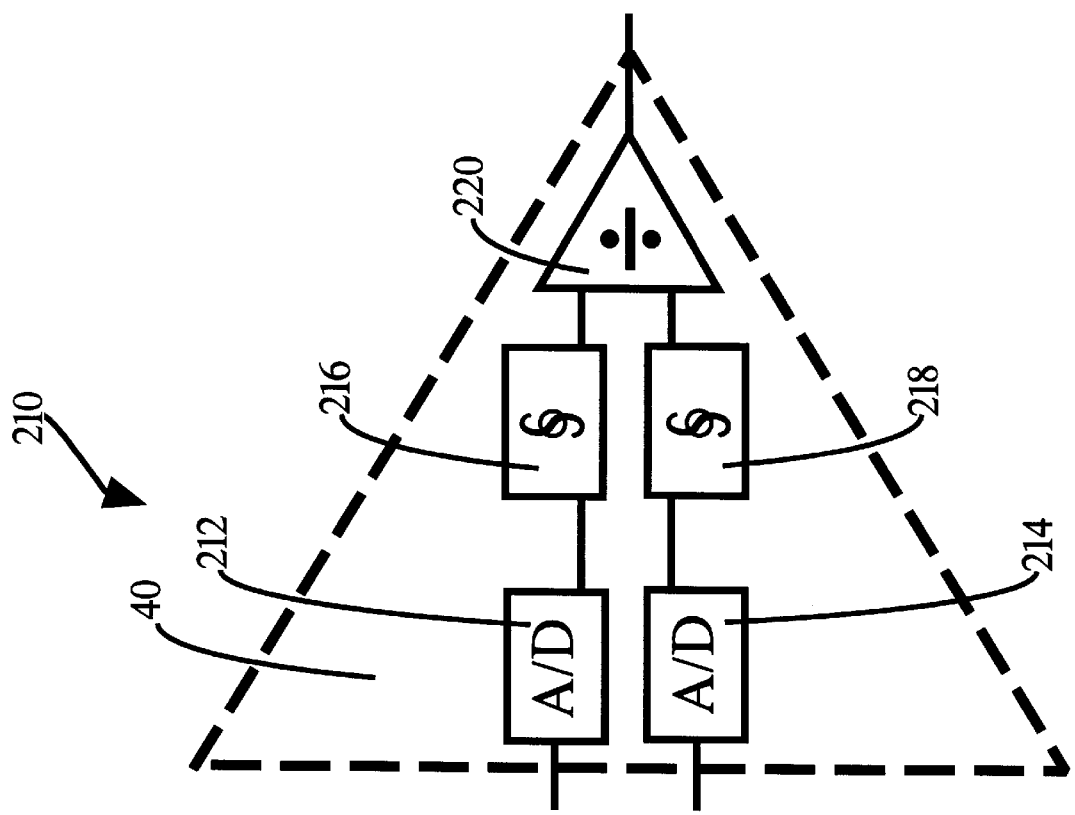
FIG. 15 is a schematic drawing of the comparator of the wavemeter, according to another embodiment of the present invention, which employs analog to digital conversion of the output of the optical photodetectors, integration of those outputs, and digital computation of the power ratios.

In another embodiment of the present invention, shown schematically in FIG. 15, the comparator 40 is implemented as an integrating digital comparator 210. In this embodiment, the photocurrent from the first photodetector 36 and the photocurrent from the second photodetector 38 are respectively connected to a first 212 and a second 214 analog to digital (A/D) converter which digitize the first and second photocurrents. To increase the sensitivity of the apparatus, in this embodiment, to permit operation at reduced light levels, the digitized photocurrents are respectively electrically connected to a first 216 and a second 218 digital integrator and the respective integrated digitized photocurrents are then digitally compared by digital comparing means 220 which produces a signal on its output corresponding to the ratio of the first photodetector 36 to second photodetector 38 photocurrents. This ratio corresponds to the wavelength of the input light.

Figure 16:
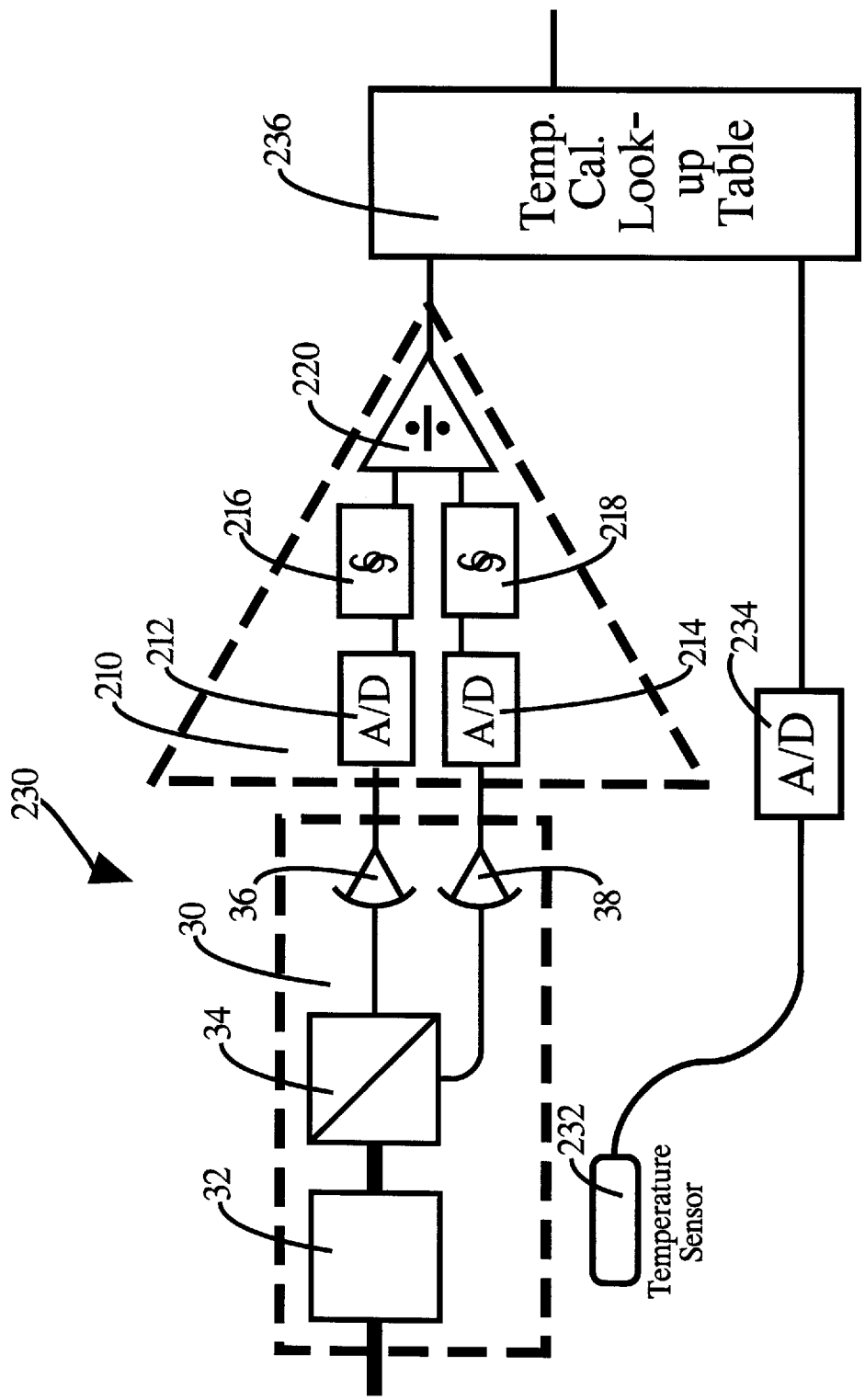
FIG. 16 is a schematic drawing of the comparator of the wavemeter, according to another embodiment of the present invention, which employs analog to digital conversion of the output of the optical photodetectors, integration of those outputs, and digital computation of the power ratios, corrected for temperature by use of a temperature sensor and calibration look-up table means.

In another embodiment of the present invention 230, shown schematically in FIG. 16, the output of the integrating digital comparator 210 is temperature corrected by means of a temperature calibration look-up table 236 so as to reduce wavelength measurement error due to variation in the wavemeter output with temperature. To measure and correct for temperature, a temperature sensor 232 is introduced in proximity to the wavemeter and the output of this temperature sensor 232 is digitized by connection of the temperature sensor output to a temperature sensor analog-to-digital converter 234. The digitized output of the temperature sensor 232 is input, along with the output of the integrating digital comparator 210, into the temperature calibrated look-up table means 236. The temperature calibration look-up table means 236 provides temperature calibration information so as to remove temperature error from the wavemeter wavelength measurement and produces a signal on its output which corresponds to the temperature corrected measured wavelength of the input light.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. A polarization interferometer apparatus using the polarization dependent phase lag in a birefringent retarder, comprising:

a controllable birefringent element for accepting light and varying retardance so as to change the polarization of the accepted light in response to control inputs and transmitting that light of changed polarization;

a first bulk optic polarizing beamsplitter for dividing the light received from said controllable birefringent element into two orthogonally polarized components, having a principle axis, orthogonal to the direction of travel of the received light, a first output port for providing one of the orthogonally polarized components of the received light, and a second output port for providing the other component of the orthogonally polarized components of the received light;

an undesired polarization output photodetector arranged to detect the light provided by the first output port of said first bulk optic polarizing beamsplitter and to produce an undesired polarization output photodetector photocurrent;

power minimizing means to accept the undesired polarization output photodetector photocurrent from said undesired polarization output photodetector and provide control inputs to said controllable birefringent element such that the undesired polarization output photodetector photocurrent from said undesired polarization output photodetector is minimized;

a bulk optic birefringent retarder, having a fast, a slow, and an other principle axes, arranged to receive light of linear polarization from the second output port of said first bulk optic polarizing beamsplitter and to transmit components of light polarized along the fast and slow axes, with the fast and slow axes oriented at an angle non-orthogonal and non-parallel to the direction of linear polarization and the other principle axis oriented in the direction of propagation of the received light;

a second bulk optic polarizing beamsplitter for dividing received light into two orthogonally polarized components, arranged to receive the transmitted components of light polarized along the fast and slow axes of said bulk optic birefringent retarder, having a principle axis, oriented to accept the light exiting said bulk optic birefringent retarder such that the principle axis is non-orthogonal and non-parallel to both the fast and slow axes of said bulk optic birefringent retarder, a first output port for providing one of the orthogonally polarized components of the received light, and a second output port for providing the other component of the orthogonally polarized components of the received light;

a first photodetector arranged to detect the light provided by the first output port of said second bulk optic polarizing beamsplitter and having means for producing a first photocurrent that corresponds to the power of the detected light on its photocurrent output;

a second photodetector arranged to detect the light provided by the second output port of said second bulk optic polarizing beamsplitter and having means for producing a second photocurrent that corresponds to the power of the detected light on its photocurrent output; and means for comparing the first and second photocurrents produced by said first and second photodetectors and providing an output signal that corresponds to the ratio of the photocurrent produced by said first photodetector to the photocurrent produced by said second photodetector which in turn corresponds to the wavelength of the light received by said controllable birefringent element.

2. A polarization interferometer apparatus using the polarization dependent phase lag in a birefringent retarder, comprising:

a fixed birefringent retarder, having a fast, a slow, and an other principle axes, arranged to receive monochromatic light of linear polarization and to transmit components of light polarized along the fast and slow axes, with the fast and slow axes oriented at an angle non-orthogonal and non-parallel to the direction of linear polarization and the other principle axis oriented in the direction of propagation of the received monochromatic light;

a polarizing beamsplitter for dividing received light into two orthogonally polarized components, arranged to receive the transmitted components of light polarized along the fast and slow axes of said birefringent retarder, having a principle axis, oriented to accept the light exiting said fixed birefringent retarder such that the principle axis is non-orthogonal and non-parallel to both the fast and slow axes of said fixed birefringent retarder, a first output port for providing one of the orthogonally polarized components of the received light, and a second output port for providing the other component of the orthogonally polarized components of the received light;

a first photodetector arranged to detect the light provided by the first output port of said polarizing beamsplitter and having means for producing a first photocurrent that corresponds to the power of the detected light on its photocurrent output;

a second photodetector arranged to detect the light provided by the second output port of said polarizing beamsplitter and having means for producing a second photocurrent that corresponds to the power of the detected light on its photocurrent output; and means for comparing the first and second photocurrents produced by said first and second photodetectors and providing an output signal that corresponds to the ratio of the photocurrent produced by said first photodetector to the photocurrent produced by said second photodetector, with a single observation, wherein the ratio of photocurrents produced by said first and second photodetectors corresponds to the wavelength of, and is insensitive to the power of, the monochromatic light received by said fixed birefringent retarder.

3. A polarization interferometer apparatus using the polarization dependent phase lag in a birefringent retarder according to claim 2, further comprising an input polarizer oriented so as to accept light of unknown polarization and transmit only light of a known linear polarization to be received by said fixed birefringent retarder.

4. A polarization interferometer apparatus using the polarization dependent phase lag in a birefringent retarder according to claim 2, wherein:

said fixed birefringent retarder is comprised of a bulk optic fabrication of birefringent material, having a fast, a slow, and an other principle axes, arranged to receive light of linear polarization and to transmit components of light polarized along the fast and slow axes, with the fast and slow axes oriented at an angle non-orthogonal and non-parallel to the direction of linear polarization and the other principle axis oriented in the direction of propagation of the received light; and said polarizing beamsplitter is comprised of a bulk optic beamsplitter for dividing the received light into two orthogonally polarized components, arranged to receive the transmitted components of light polarized along the fast and slow axes of said bulk optic fabrication of birefringent material, having a principle axis, oriented to accept the light exiting said bulk optic fabrication of birefringent material such that the principle axis is non-orthogonal and non-parallel to both the fast and slow axes of said bulk optic fabrication of birefringent material, a first output port for providing one of the orthogonally polarized components of the received light, and a second output port for providing the other component of the orthogonally polarized components of the received light.

5. A polarization interferometer apparatus using the polarization dependent phase lag in a birefringent retarder according to claim 3, wherein:

said input polarizer is comprised of a length of polarizing fiber of sufficient length to ensure adequate polarization of the accepted monochromatic light that transmits light polarized along a preferred axis with low loss and light polarized orthogonally to the preferred axis with high loss; said fixed birefringent retarder is comprised of a length of birefringent fiber; and said polarizing beamsplitter is comprised of an all-fiber device.

* * * * *